United States Patent [19]
Perry

[11] Patent Number: 6,143,395
[45] Date of Patent: Nov. 7, 2000

[54] COMPUTER MOUSE PAD

[76] Inventor: Robert C. Perry, 5755 SW. Willow La., Lake Oswego, Oreg. 97035-5340

[21] Appl. No.: 09/209,050
[22] Filed: Dec. 9, 1998
[51] Int. Cl.[7] .................................. B32B 3/00; G09G 5/08
[52] U.S. Cl. .......................... 428/156; 428/167; 345/163
[58] Field of Search ..................................... 428/156, 172, 428/167, 141; 248/346.01, 118.1; 2/16, 20; 400/715; 345/157, 163, 167; 341/22

[56] References Cited

U.S. PATENT DOCUMENTS

| | | | |
|---|---|---|---|
| 4,485,919 | 12/1984 | Sandel | 428/158 |
| 4,799,054 | 1/1989 | House | 340/710 |
| 4,868,940 | 9/1989 | Masadi | 428/159 |
| 5,360,653 | 11/1994 | Ackley | 428/71 |
| 5,508,084 | 4/1996 | Reeves et al. | 428/172 |

*Primary Examiner*—Donald Loney
*Attorney, Agent, or Firm*—John Smith-Hill; Smith-Hill and Bedell

[57] ABSTRACT

The upper surface of a mouse pad is formed with grooves of width substantially smaller than the diameter of the mouse ball, whereby particles that fall in the grooves do not adhere to the mouse ball when the mouse is moved over the mouse pad.

7 Claims, 2 Drawing Sheets

COMPUTER MOUSE PAD

BACKGROUND OF THE INVENTION

This invention relates to a computer mouse pad.

A computer mouse is widely used as a pointing device for a personal computer, for controlling movement of a cursor over the display screen of the computer's monitor. The common form of computer mouse has a mouse body for gripping in the user's hand, the mouse body having a bottom wall which slides over a mouse pad. The bottom wall of the mouse body is formed with an opening which affords access to a cavity containing a mouse ball and a movement encoding mechanism. The mouse ball typically has a diameter of about 13/16 inch. A retainer plate formed with a circular hole is fitted removably in the opening in the bottom wall of the mouse body. The diameter of the circular hole in the retainer plate is somewhat smaller than the diameter of the mouse ball, so the mouse ball is held captive in the cavity in the mouse body but protrudes through the hole in the retainer plate. As the user slides the mouse over the mouse pad, the mouse ball rolls against the movement encoding mechanism, which detects the rolling movement of the mouse ball and generates an electrical pulse signal in response thereto. The pulse signal is supplied to the computer's system unit and is used by the system unit to control movement of the cursor over the computer's monitor screen.

The computers that are used in schools are frequently equipped with mouses. If foreign matter, such as a dust particle, is present on the mouse pad, it might adhere to the mouse ball when the mouse moves over the particle. In this event, the particle might be carried by the mouse ball into the cavity of the mouse body and be transferred to the movement encoding mechanism. There is then a possibility that operation of the movement encoding mechanism will be impaired. This may lead to erratic movement of the cursor. Although efforts are made to keep school computer labs clean, the computer mouse is frequently in need of cleaning to remove dirt from the ball and from the movement encoding mechanism.

A typical mouse pad is made of a resilient material, such as rubber. The upper surface of the mouse pad, on which the mouse slides, is smooth except for a layer of fabric which is glued to the upper surface of the mouse pad in order to provide frictional engagement with the mouse ball.

SUMMARY OF THE INVENTION

In accordance with the invention there is provided a mouse pad having a lower surface for resting on a support structure and an upper surface for supporting a mouse, the upper surface of the mouse pad being formed with grooves of width substantially smaller than the diameter of the mouse ball, whereby particles that fall in the grooves do not adhere to the mouse ball when the mouse is moved over the mouse pad.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
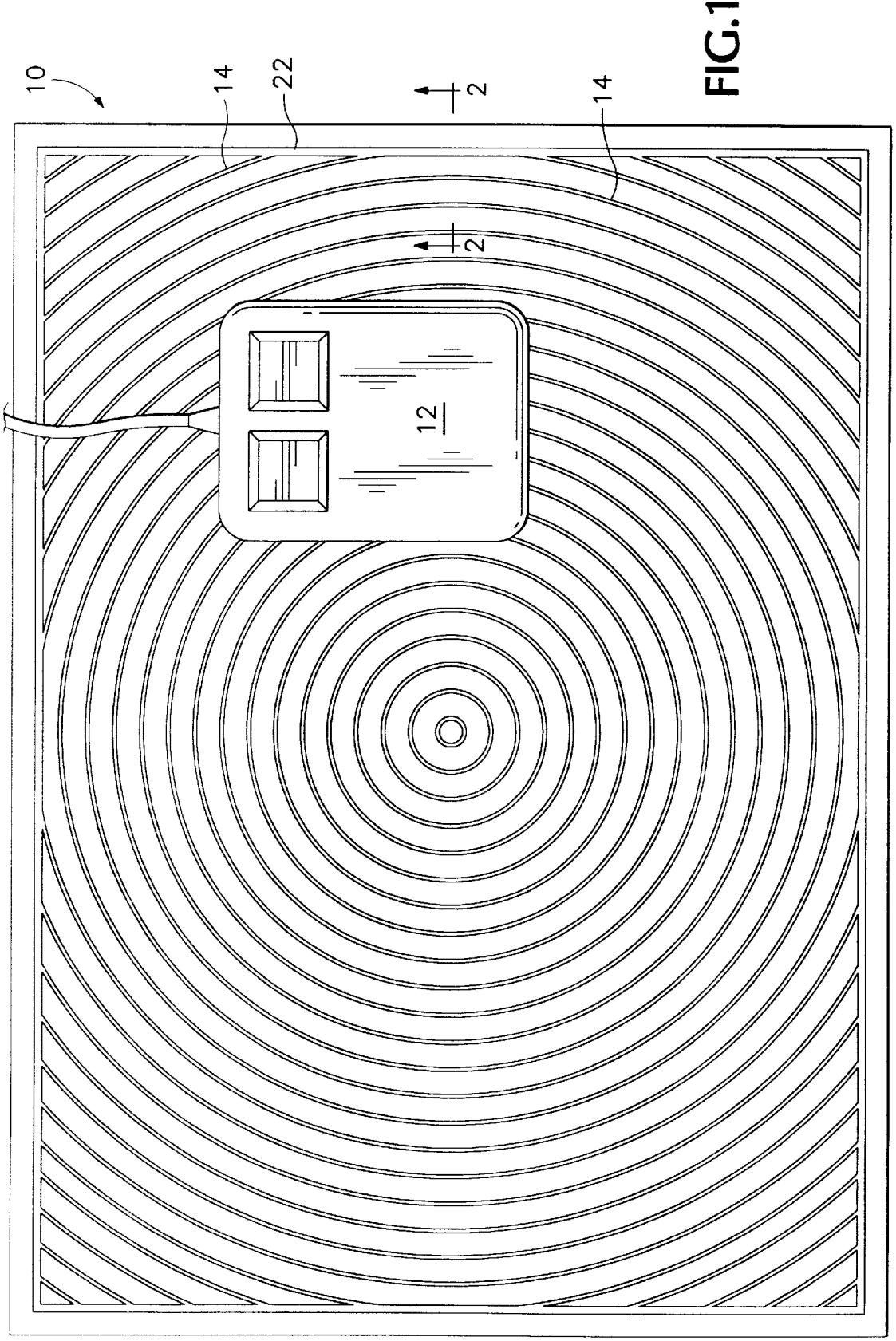
FIG. 1 is a top plan view of a first mouse pad in accordance with the present invention.

The mouse pad shown in FIG. 1 is designed for use with a mouse having a ball about 13/16 inch in diameter. The mouse pad is made of a semisoft rubber material. The rubber material has a durometer which is typically in the range 30–40 and is preferably about 35. This is comparable to the durometer of the rubber used in manufacture of conventional mouse pads. There is no layer of fabric attached to the upper surface of the pad. On the contrary, the pad is molded to provide a pattern of narrow grooves, each typically about 1/32 inch wide and at a spacing of about 3/16 inch, in its upper surface. The grooves are about 1/16 inch deep. The upper corners of the grooves, where the grooves meet the upper surface of the pad, are sharp.

By forming the grooves in the upper surface of the pad, the effective surface area of the mouse pad is reduced by about one-seventh. Approximately one-seventh of the dust particles that are precipitated on the mouse pad will fall in one of the grooves. Once a dust particle has fallen into a groove, it will remain in the groove until it is removed, e.g. by shaking the mouse pad or by vacuuming, and will not be picked up by the mouse ball and contaminate the movement encoding mechanism. Further, since the effective surface area of the mouse pad is reduced, the area of the mouse pad from which a particle can be picked up by the mouse ball during movement of the mouse is reduced. Moreover, if a particle of dust is picked up by the mouse ball and carried by the mouse ball while the ball rotates, there is a possibility that the particle will fall from the mouse ball into a groove.

Figure 2:
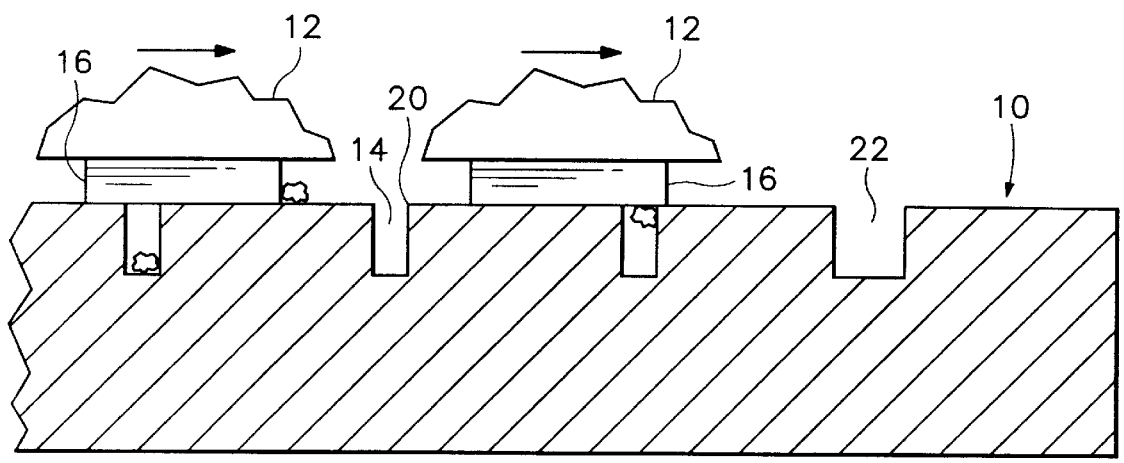
FIG. 2 is a sectional view taken on the line II—II in FIG. 1.

The bottom wall of the conventional mouse body is formed with gliders which rest on the upper surface of the mouse pad. These gliders serve to sweep a foreign particle that settles on the land between two grooves toward the next groove along the path of movement of the mouse, as shown in FIG. 2. The particle may either fall into the groove as the glider advances across the groove or be wiped from the glider by the sharp edge at the far side of the groove so that the particle then falls into the groove.

Since the width of the grooves is substantially less than the diameter of the mouse ball (only about one-twenty fifth of the diameter of the mouse ball in the case of the example), the grooves do not adversely affect the smoothness with which the ball rolls over the mouse pad and hence the smoothness with which the mouse slides over the mouse pad.

The rubber that is used in manufacture of conventional mouse pads is somewhat sticky or gummy. This does not affect the performance of the mouse because the conventional pad has a covering of fabric, as mentioned above. However, when there is no covering, the gliders on the bottom of the mouse do not slide smoothly over the mouse pad, and foreign particles on the mouse pad tend to stay in place and are not readily swept over the mouse pad by the gliders of the mouse. It is therefore preferred that the mouse pad in accordance with the invention not be made of the same type of rubber material as is used in manufacture of conventional mouse pads but that the composition of the rubber material be formulated so that it is not gummy or sticky. It has been found that a suitable material is thermal plastic rubber. In particular, the material sold under the designation SANTOPRENE, grade 103-40 is currently preferred.

As shown in FIG. 1, the pattern of grooves is made up of narrower concentric arcuate grooves and a slightly wider peripheral groove along the four edges of the mouse pad, surrounded by a margin strip. Some of the arcuate grooves intersect the peripheral groove. The width of the peripheral groove is greater than the possible error in position of an end of one of the arcuate grooves that intersect the peripheral groove, so that when the die for molding the pad is made, one can be assured that each arcuate groove that intersects the peripheral groove will open into the peripheral groove and will not encroach on the margin strip of the pad.

It will be appreciated that the invention is not restricted to the particular embodiment that has been described, and that variations may be made therein without departing from the scope of the invention as defined in the appended claims and equivalents thereof.

What is claimed is:

1. A mouse pad having a lower surface for resting on a support structure and an upper surface for supporting a mouse having a mouse ball, the upper surface of the mouse pad being formed with grooves that are large enough that dust particles will fall into the grooves and will not adhere to the mouse ball when the mouse is moved over the mouse pad, the grooves being of width substantially smaller than the diameter of the mouse ball and being spaced at a distance substantially greater than the width of the grooves so that the mouse ball rolls smoothly over the mouse pad, and wherein the grooves are in a pattern of concentric arcs.

2. A mouse pad having a lower surface for resting on a support structure and an upper surface for supporting a mouse having a mouse ball, the upper surface of the mouse pad being formed with grooves that are large enough that dust particles will fall into the grooves and will not adhere to the mouse ball when the mouse is moved over the mouse pad, the grooves being of width substantially smaller than the diameter of the mouse ball and being spaced at a distance substantially greater than the width of the grooves so that the mouse ball rolls smoothly over the mouse pad, and wherein the grooves are at a spacing of about six times their width.

3. A mouse pad according to claim 1, wherein the grooves are about 1/32 inch in width and are at a spacing of about 3/16 inch.

4. A mouse pad according to claim 3, wherein the grooves are about 1/16 inch deep.

5. A mouse pad having a lower surface for resting on a support structure and an upper surface for supporting a mouse having a mouse ball, the upper surface of the mouse pad being formed with grooves that are large enough that dust particles will fall into the grooves and will not adhere to the mouse ball when the mouse is moved over the mouse pad, the grooves being of width substantially smaller than the diameter of the mouse ball and being spaced at a distance substantially greater than the width of the grooves so that the mouse ball rolls smoothly over the mouse pad, and wherein the grooves are about 1/16 inch deep.

6. A mouse pad having a lower surface for resting on a support structure and an upper surface for supporting a mouse having a mouse ball, the upper surface of the mouse Pad being formed with grooves that are large enough that dust particles will fall into the grooves and will not adhere to the mouse ball when the mouse is moved over the mouse pad, the grooves being of width substantially smaller than the diameter of the mouse ball and being spaced at a distance substantially greater than the width of the grooves so that the mouse ball rolls smoothly over the mouse pad, and wherein the grooves have elongate ridges therebetween.

7. A mouse pad according to claim 6, wherein the grooves are steep-sided and the sides of a groove meet the ridges at each side of the groove at a sharp edge, whereby a particle adhering to the underside of the mouse may be wiped from the mouse as the mouse traverses the groove.

* * * * *

UNITED STATES PATENT AND TRADEMARK OFFICE
CERTIFICATE OF CORRECTION

PATENT NO. : 6,143,395
DATED : November 7, 2000
INVENTOR(S) : Robert C. Perry

It is certified that error appears in the above-identified patent and that said Letters Patent is hereby corrected as shown below:

Column 4, line 1 (claim 3, line 1), "1" should be deleted and replaced with --2--.

Column 4, line 20 (claim 6, line 4), "Pad" should be deleted and replaced with --pad--.

Signed and Sealed this

Eighth Day of May, 2001

Attest:

NICHOLAS P. GODICI

*Attesting Officer*  *Acting Director of the United States Patent and Trademark Office*